Figure 4:
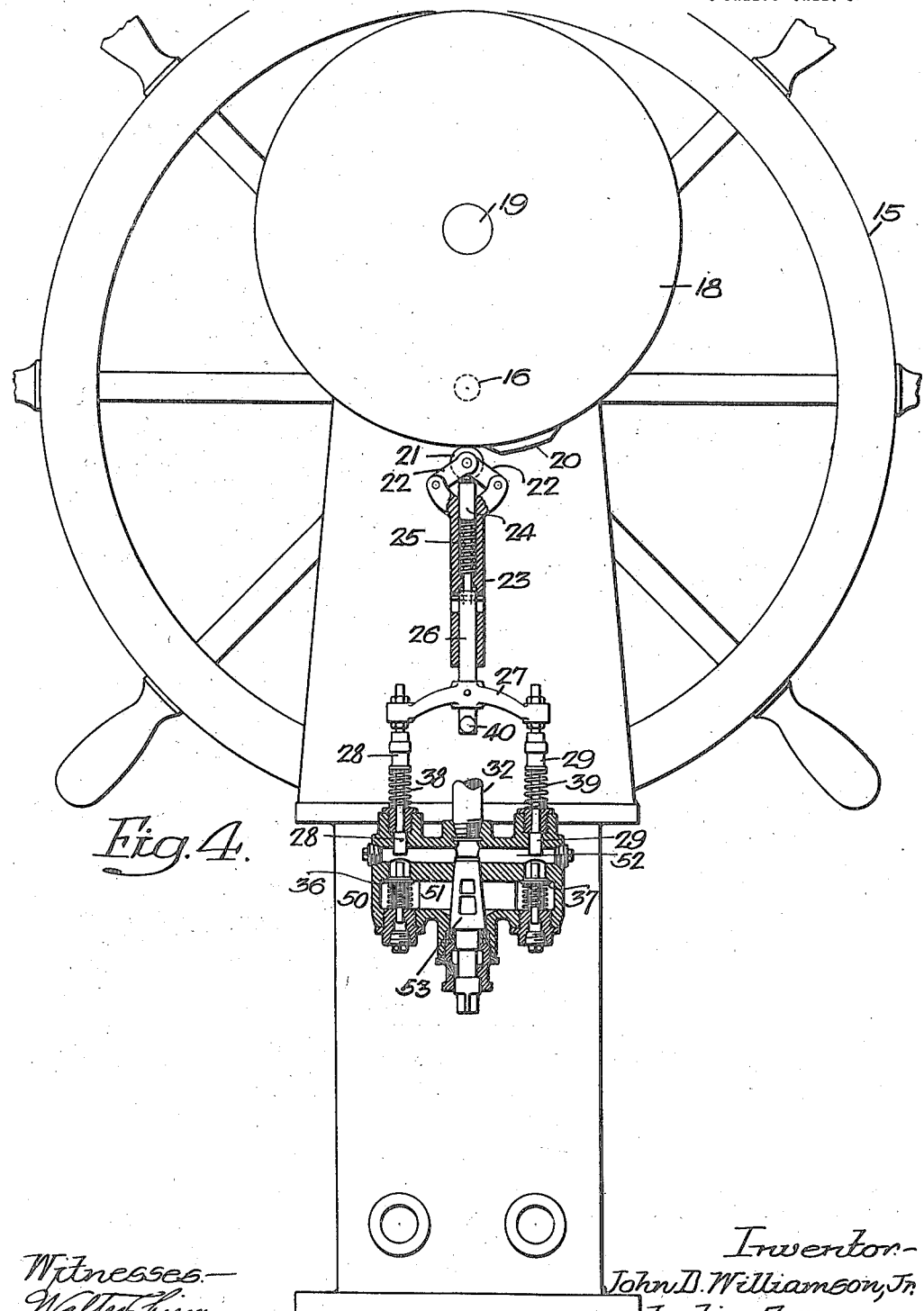

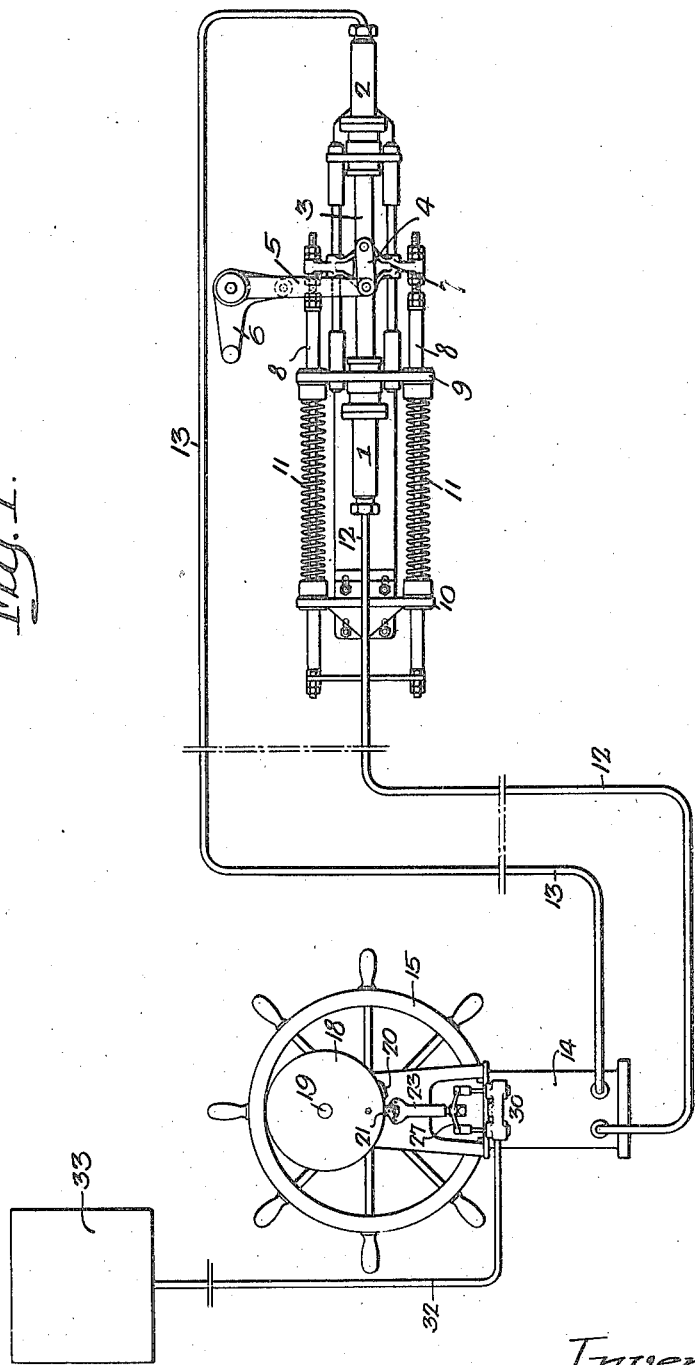

J. D. WILLIAMSON, Jr.
EQUALIZING MECHANISM FOR TELEMOTOR SYSTEMS.
APPLICATION FILED MAR. 10, 1915.
1,213,721.
Patented Jan. 23, 1917.
5 SHEETS—SHEET 2.
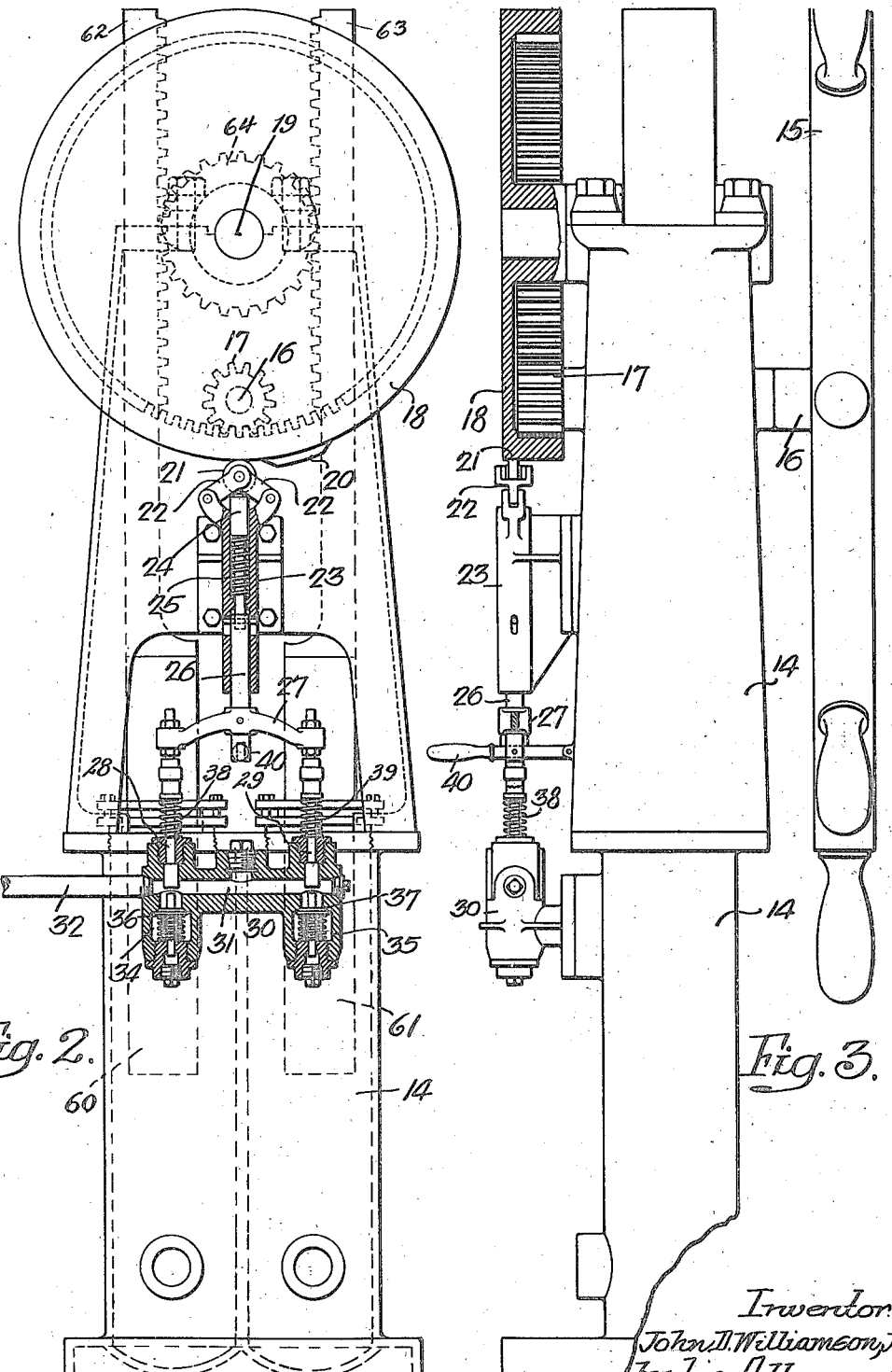

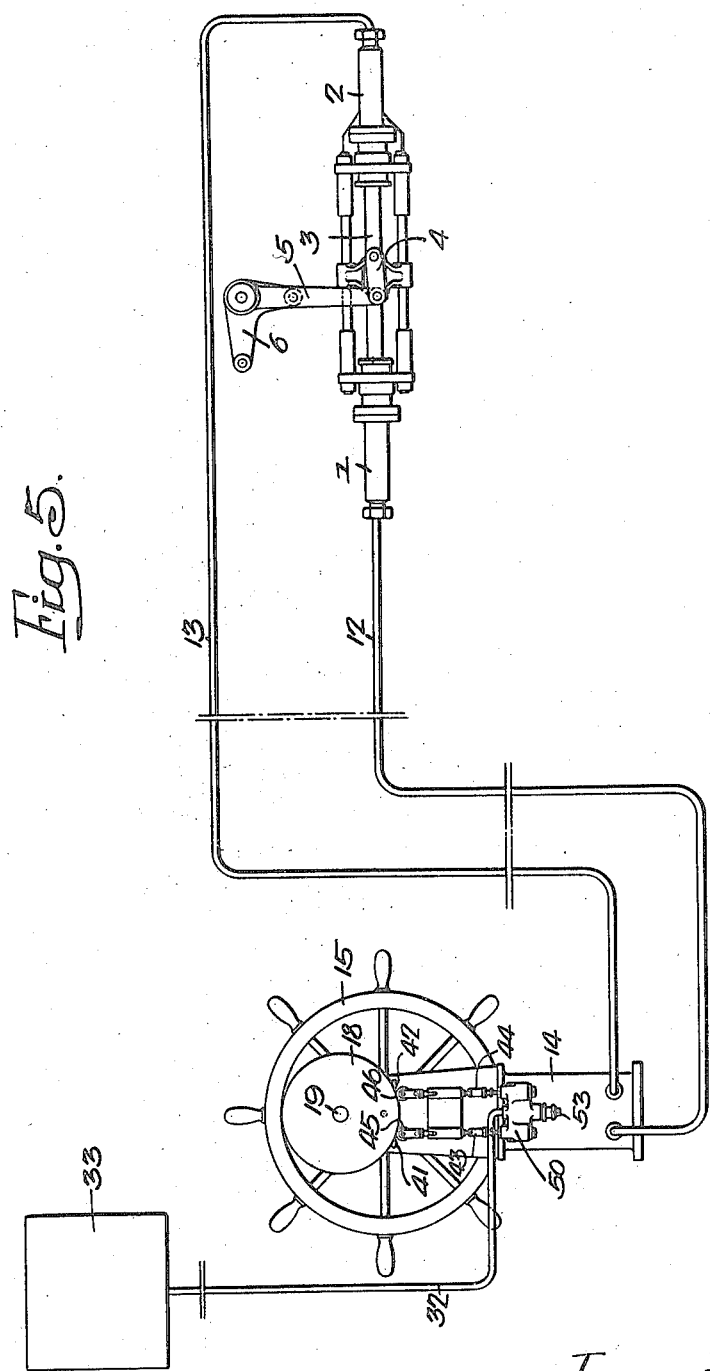

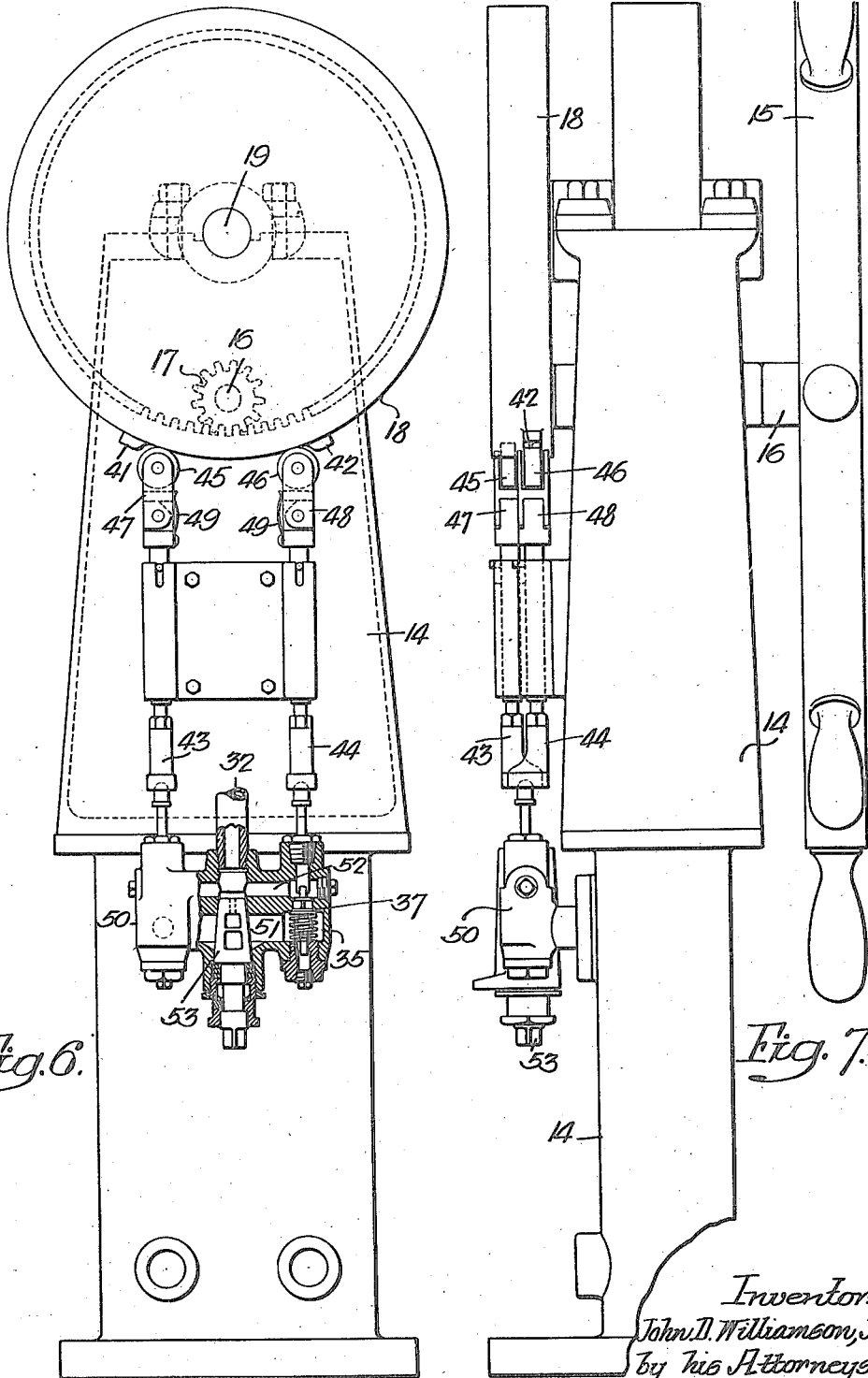

UNITED STATES PATENT OFFICE.

JOHN D. WILLIAMSON, JR., OF PHILADELPHIA, PENNSYLVANIA, ASSIGNOR TO AMERICAN ENGINEERING COMPANY, OF PHILADELPHIA, PENNSYLVANIA, A CORPORATION OF PENNSYLVANIA.

EQUALIZING MECHANISM FOR TELEMOTOR SYSTEMS.

1,213,721.  Specification of Letters Patent.  Patented Jan. 23, 1917.

Application filed March 10, 1915. Serial No. 13,476.

*To all whom it may concern:*

Be it known that I, JOHN D. WILLIAMSON, Jr., a citizen of the United States, residing in Philadelphia, Pennsylvania, have invented certain Improvements in Equalizing Mechanism for Telemotor Systems, of which the following is a specification.

One object of my invention is to provide novel, substantial and relatively simple mechanism particularly designed for use in hydraulic telemotor systems for automatically equalizing the pressures in the different parts of such system or preventing excess or deficiency of pressures, each time the steering wheel is brought to its amidships position, the invention contemplating an arrangement of parts whereby at such times communication is automatically established between one or both of the sides of the system and a storage tank.

A further object of the invention is to provide novel means for manually effecting the equalization of the pressures on the two sides of a telemotor system particularly one which employs spring centered telemotors, with a view to quickly centering such system.

The invention also includes a novel form of controlling or equalizing valve together with a novel, relatively simple and inexpensive combination of coöperating parts.

These objects and other advantageous ends I secure as hereinafter set forth, reference being had to the accompanying drawings in which, Figure 1 is a diagrammatic view illustrating a hydraulic telemotor system embodying my invention; Figs. 2 and 3 are respectively a front and a side elevation, both partly in section and on an enlarged scale, illustrating the equalizing valves and the associated mechanism employed in the system shown in Fig. 1; Fig. 4 is a front elevation, partly in section, showing a modified form of the equalizing valve illustrated in Fig. 2; Fig. 5 is a diagrammatic view illustrating a system in which the telemotors are not of the spring centered type; and Figs. 6 and 7 are respectively a front and side elevation, the first partly in section, illustrating the equalizing valve and the associated mechanism employed in the system shown in Fig. 5.

In the above drawings, 1 and 2 represent the after-telemotors of a rudder controlling system, whose plungers 3 are connected through a link 4 with a lever arm 5, which, in turn, is connected to one arm of a lever 6 whereby a rudder or the mechanism controlling the same is controlled. The cross-head 7 which is connected to the plungers 3, has operative upon it a pair of rods slidable through guideways 9 and 10 and is so acted on by springs 11 that through them said plungers are automatically returned or tend to return to their mid position whenever they are moved therefrom.

The two telemotor cylinders 1 and 2 are connected through pipes 12 and 13 with the forward telemotors which have their cylinders mounted in or attached to a structure 14, and their plungers 60 and 61 designed to be manually moved in either direction through racks 62 and 63 which mesh with a pinion 64 fixed to a shaft 16 turned by the steering wheel 15. The detail construction of this apparatus forms no part of my invention and I have therefore merely indicated the parts without detail.

The shaft 16 of the steering wheel has fixed to it a pinion 17 meshing with the teeth of an internal gear 18 mounted on a shaft 19 suitably journaled in the upper part of the structure 14. At a suitable point of the external surface of this gear 18 I provide a lug or projecting cam structure 20 designed to coöperate with an antifriction roller 21 mounted on a spindle supported by a pair of links 22 which in turn are pivoted to the forks of a fixed tubular guiding structure 23. Within this latter is mounted a plunger 24, which, by means of a spring 25, at all times presses the roller 21 into engagement with the external surface of the gear 18, and through a sliding rod 26 is operatively connected to a yoke 27 from whose extremities a pair of spindles 28 and 29 extend downwardly through suitable stuffing boxes into a valve casing 30. This valve casing consists of a casting having a transversely extending chamber 31 which through a pipe 32, is connected to a storage tank 33, and through valve seated openings, communicates with two passages 34 and 35 connected through extensions of the valve casing to the two forward telemotor cylinders within the structure 14. Communication between the passage 34 and the chamber 31 is normally cut off by a valve 36 held to its seat by a suitable spring and a similar spring acts upon a valve 37 to likewise normally cut off communication between the passage 35 and said chamber.

The two rods 28 and 29 extend into the chamber 31 and when they are moved downwardly against the action of their springs 38 and 39, they may be brought into engagement with the spindles projecting from the valves so as to unseat the latter. It is to be noted that the construction and adjustment of parts is such that when the steering wheel 15 is in a position corresponding with the amidships position of the rudder, and the telemotor plungers 3 are in their central positions under the action of the springs 11, the lug or cam surface 20 of the gear 18 is in engagement with the roller 21, depressing the plunger 24 with the rod 26, yoke 27 and the rods 28 and 29, thus holding open the valves 36 and 37. There is consequently free communication not only between the two forward telemotors but also between the after telemotors, and the system as a whole is in free communication with the storage tank 33.

Under operating conditions, if the steering wheel be moved from its amidships position, the resulting operation of the gear 17 at once rotates the gear 18 sufficiently to free the roller 21 from engagement with the cam surface 20. As a result the valve rods 28 and 29 are at once moved up, thus permitting the check valves 36 and 37 to close, and the continued revolution of the steering wheel causes operation of the forward telemotors within the structure 14 so that liquid under pressure is supplied to one of the telemotors 1 or 2 and permitted to flow away from the other. The rudder is thereby actuated in the well known manner.

In case there is any expansion of the liquid in the pipes 12 and 13 due to their proximity to a source of heat, or if there should be any vacuum or falling off of pressure due to leakage, the turning of the steering wheel and of the gear 18 to the amidships position, results in the striking of the lug 20 upon the roller 21 just before such position is reached causing a depression of the rods 28 and 29 and an opening of the valves 36 and 37, so that as before described, free communication is established between the forward telemotors and, through the pipes 12 and 13, between the cylinders of the after-telemotors. Moreover, since the chamber 31 is in constant communication with the storage tank 33, any leakage of liquid from the system is automatically made up or any excess of liquid is allowed to escape at this time.

In order to make possible the instantaneous centering of this system, I mount a hand lever 40 on the structure 14 and pivot this to the lower end of the rod 26. With such an arrangement of parts, a depression of said lever will force down the rods 28 and 29, thus opening the valves 36 and 37 and by establishing communication between the two sides of the system allow the plungers 3 of the after-telemotors to be at once centered by their springs 11.

In cases where telemotors are employed without centering springs, I provide the apparatus shown in Figs. 5 to 7 inclusive and provide on the periphery of the gear 18 two lugs or cam projections 41 and 42. In this case I slidably guide on the supporting structure 14 two independent rods 43 and 44, carrying rollers 45 and 46 respectively in such positions as to normally bear upon the external surface of the gear 18 and be acted on by said lugs. The construction of the upper ends of these rods is such that the rollers 45 and 46 are respectively carried on arms 47 and 48 hinged to their upper ends and free to move in one direction against the action of a spring 49. On the other hand they are prevented from such movement when engaged from the opposite direction, in which case they with their rods are forced downward. The lower ends of these rods enter a valve casing 50 having two chambers 51 and 52, of which the first is divided into two parts by a suitable valve such as the plug cock 53, whose lower end projects through a stuffing box and is squared for the reception of a wrench.

The second chamber 52 communicates through the pipe 32 with the storage tank 33 and is connected to the chamber 51 through the valve seated passages normally closed by spring pressed valves 36 and 37 as before. In this case, when the steering wheel 15 is turned from its amidships position, liquid is forced from the forward-telemotors through the pipe 13 for example, to the telemotor system 2 and the rudder is therefore operated as the plunger 3 moves into the cylinder 1. This same movement of the steering wheel brings the lug 42 in engagement with the roller 46 but owing to the mounting of the hinged arm 48 this latter merely turns on its pivot to permit a passage of said cam.

When the steering wheel is subsequently moved to operate the rudder toward its amidships position, liquid is forced through the pipe 12 to the telemotor system 1, and just before it reaches said position, the lug 42 again engages the roller 46 on the arm 48, which in this case is not permitted to turn on its pivot but is forced downwardly, opening the valve 37 and establishing connection between the pipe 13, the cylinder 2 and the storage tank 33. This permits any deficiency or excess of liquid in that side of the system not under pressure to be automatically taken care of as before, and the same action obviously occurs when the lug 41 moves from right to left into engagement with the roller 45, for communication is opened between the storage tank and that side of the system not under pressure. In this case the structure 50 has the form of a casing embodying the seat of a manually operated valve 53, which may be turned at any time so as to establish communication between the two parts of the chamber 51 in order to permit equalization of the pressures in the two parts of the system. For example, if in operating the system, the forward and after telemotors become "out of truth" so that when the rudder is in its amidships position the steering wheel and the plungers of the forward telemotors are in some position other than central, the cock or valve 53 is opened and the steering wheel turned to said central position. As a result the plunger of one of the forward telemotors forces liquid from its cylinder through the chamber 51 and valve 53 from one side of the system to the other until both plungers occupy the same relative positions in their cylinders, when said valve is closed, and the system is ready for operation.

If it be desired to employ this form of manually operated equalizing valve with spring centered after-telemotors, the parts would be arranged as illustrated in Fig. 4. In this case, while a pair of rods 28 and 29 operated from a single cam 20, are employed, these are used in connection with a valve casing of the form illustrated at 50 in Fig. 6. The operation of the valve 53, by connecting the two parts of the system as described in connection with the use of the hand lever 40, will at any time permit the automatic centering of the after-telemotors under the action of their springs 11.

I claim:—

1. A system including two sets of telemotors; pipes respectively connecting the telemotors of the two sets; a casing connected to both sides of the system; a storage tank connected to the casing; valves in said casing placed to respectively connect the sides of said system to said tank; a steering wheel; and means for causing said wheel to operate the valves under predetermined conditions.

2. A system including two sets of telemotors; pipes respectively connecting the telemotors of said sets; a casing connected to both sides of the system; valves in said casing placed to respectively permit communication between the sides of the system and said casing; a steering wheel; and means actuated when said wheel is operated to its mid position for opening said valves.

3. A telemotor system including a casing connected to both sides thereof; a storage tank also connected to said casing; two valves for controlling the flow of fluid between the casing and the telemotor system; a steering wheel; and means for simultaneously opening said valves when the steering wheel is moved to its mid position.

4. A telemotor system including a casing connected to both sides thereof; two normally closed valves controlling the flow of fluid between the two sides of the system and said casing; a steering member; and means for opening one at least of said valves when said member is moved to its mid position.

5. A telemotor system including a casing connected to both sides thereof; two normally closed valves controlling the flow of fluid between the two sides of the system and said casing; a steering member; means for opening one at least of said valves when said member is moved to its mid position; with hand operated means for actuating said valves.

6. A telemotor system including a casing connected to both sides thereof; two normally closed valves controlling the flow of fluid between the two sides of the system and said casing; a steering member; means for opening one at least of said valves when said member is moved to its mid position; with a hand operated valve in the casing for permitting flow of fluid between the sides of the system independently of said valves.

7. A telemotor system including a casing connected to the two sides thereof; a storage tank also connected to the casing but normally cut off from the system by said valves; a steering wheel; and means actuated by said wheel for opening one at least of said valves as said wheel is moved to its mid position.

8. A telemotor system including a storage tank; two valves respectively controlling communication between the sides of the system and said tank; a steering wheel; a cam operatively connected thereto; and means for causing opening of at least one of said valves by said cam when the steering wheel is moved to a predetermined position.

9. A telemotor system including a storage tank; two valves respectively controlling the connection between the sides of said system and said tank; means controlled by the steering wheel for opening said valves when it occupies a predetermined position; and a third manually controlled valve for connecting the sides of the system independently of said first valves.

10. A telemotor system including a casing; two normally closed valves therein controlling fluid flow between the sides of the system and said casing; two members extending into the casing for actuating said valves; a steering wheel; and means actuated by said wheel for operating the valve actuating members.

11. A telemotor system including two spring centered telemotors; a casing connected to the sides of said system; valves in the casing normally preventing communication between the sides of the system; rods for actuating said valves; a steering wheel; and means controlled by said wheel for operating the rods to open the valves.

12. A telemotor system including a casing connected to the sides thereof; normally closed valves in said casing controlling communication between the sides of the system; a steering wheel; a cam operatively geared thereto; with a member actuated by said cam for simultaneously operating said valves.

In testimony whereof, I have signed my name to this specification, in the presence of two subscribing witnesses.

JOHN D. WILLIAMSON, Jr.

Witnesses:
WILLIAM E. BRADLEY,
WM. A. BARR.